US008521426B2

(12) United States Patent
Kelly et al.

(10) Patent No.: US 8,521,426 B2
(45) Date of Patent: Aug. 27, 2013

(54) SYSTEM AND METHOD FOR WEATHER MAPPING TO ROAD SEGMENTS

(75) Inventors: Terence F. Kelly, Madison, WI (US); Victor W. Marsh, Fitchburg, WI (US); Christopher W. Kelly, Philadelphia, PA (US); Kevin E. Baird, Madison, WI (US)

(73) Assignee: Weather Central, LP, Madison, WI (US)

( * ) Notice: Subject to any disclaimer, the term of this patent is extended or adjusted under 35 U.S.C. 154(b) by 681 days.

(21) Appl. No.: 12/365,561

(22) Filed: Feb. 4, 2009

(65) Prior Publication Data
US 2009/0312943 A1 Dec. 17, 2009

Related U.S. Application Data

(60) Provisional application No. 61/026,011, filed on Feb. 4, 2008.

(51) Int. Cl.
*G01C 21/00* (2006.01)

(52) U.S. Cl.
USPC .............................. 701/465; 702/3

(58) Field of Classification Search
USPC ................. 701/200, 201, 204, 465; 702/3
See application file for complete search history.

(56) References Cited

U.S. PATENT DOCUMENTS

| 5,638,280 A * | 6/1997 | Nishimura et al. ........... 701/418 |
| 6,263,276 B1 * | 7/2001 | Yokoyama et al. ........... 701/420 |
| 6,591,255 B1 * | 7/2003 | Tatum et al. ..................... 706/25 |
| 2007/0155404 A1 * | 7/2007 | Yamane et al. ............ 455/456.1 |
| 2008/0071465 A1 * | 3/2008 | Chapman et al. ............. 701/117 |

* cited by examiner

*Primary Examiner* — Thomas Black
*Assistant Examiner* — Shardul Patel
(74) *Attorney, Agent, or Firm* — Meunier Carlin & Curfman, LLC

(57) ABSTRACT

A computer-implemented method for generating a weather index mapped to a road segment for a particular time frame includes receiving weather condition information for a plurality of time periods, parsing the weather condition information to determine weather conditions for a road segment defined by a starting point and an ending point for the plurality of time periods, and generating a plurality of weather indices for the road segment. Each weather index is associated with one of the plurality of time periods and is representative of a predicted traffic impact based on historical information of the received weather conditions for the road segment. The plurality of time periods includes at least one future time period and the weather condition information includes forecasted weather information.

21 Claims, 3 Drawing Sheets

SYSTEM AND METHOD FOR WEATHER MAPPING TO ROAD SEGMENTS

CROSS-REFERENCE TO RELATED APPLICATIONS

This application claims priority on U.S. Provisional Application No. 61/026,011, filed Feb. 4, 2008, the entirety of which is herein incorporated by reference.

FIELD OF THE INVENTION

The present invention pertains generally to systems and methods for generating weather and traffic information and for presenting weather and traffic reports and forecasts and the like, and, more specifically, to systems and methods for providing past, current, and forecast weather condition information for use in traffic forecasting, route navigation, traffic flow, and routing, and more particularly, to the generation of information and indexes for specific road segments based on past, present, and future weather conditions.

BACKGROUND OF THE INVENTION

Weather is one of the most significant conditions that affect how people and goods get from one location to another. The ability to easily make travel decisions based on weather conditions is important for saving both time and money. The current methods for making these weather decisions for specific road segments requires the collection of a wide variety of weather sources that can be widely dispersed and which have no specific correlation with a segment of road. In addition, the weather data does not include any value added indexing that helps in the decision making on movement along that road segment. Embodiments of the present invention are designed to provide road segment specific weather indexing and information in a format that is easier to use in third party systems that are making decisions on travel and routing.

Traffic and weather go together. Traffic and weather represent two of the most practical categories of information and news that many individuals use almost every day in planning and living their lives. Thus, it makes sense that traffic and weather information are most often provided together, side by side. For example, drive-time radio will often provide a traffic report, followed immediately by a weather report, or vice versa, to listening commuters several times an hour. Similarly, on-line services will offer or present traffic and weather reports in close proximity, e.g., on a website offered by the same provider. Thus, for example, on a general news or information website one will typically find the links for traffic and weather reports close together, or even right next to each other.

Besides their common importance in people's lives, traffic and weather also go together in another sense. It is well known that weather is an important component in determining traffic flow along roadways. Weather conditions, particularly severe weather conditions, often can affect traffic conditions. Normal traffic conditions and drive times can be affected significantly by severe weather conditions such as heavy rain, snow, ice, and the like.

Thus, weather conditions must be taken into account in order to model accurately traffic conditions. For example, TrafficCast of Madison, Wis., employs forecast weather condition information in combination with historical traffic data to provide an accurate model of traffic conditions that may be used to predict traffic conditions on specific routes at specific points in time in the future. Using historical traffic data for particular travel routes in combination with current or predicted traffic affecting weather conditions and other data an accurate forecast of traffic conditions along a route may be obtained. For example, by analyzing historic traffic conditions, a model of travel times along a section of roadway may be obtained for, for example, particular days, days of the week, seasons of the year, times of day, etc. By analyzing such historic traffic data along with the historic weather data, the effect of various weather conditions on traffic conditions also may be determined and included in the traffic forecast model. Using such a model based on historic traffic and weather information, along with known or predicted future conditions, e.g., predicted weather conditions from a weather forecast model, a forecast of traffic conditions, e.g., travel times, along a roadway may be determined. Such a traffic forecast may be included as part of a traffic report that is provided to users, e.g., via the internet, any portable or otherwise personally addressable communication device, radio or television broadcast, etc.

The weather information employed by the TrafficCast traffic models is provided by MyWeather LLC of Madison, Wis., in a form that is specific to the TrafficCast traffic models. Specifically, for this purpose, a geographic area having various traffic routes of interest to be modeled is divided into a grid. Weather products are generated for each grid area by MyWeather and provided to TrafficCast for use in the TrafficCast traffic forecast models. For example, the weather products for each grid area include weather forecast information generated by MyWeather using a weather forecasting model, such as the ADONIS Microcast weather model, available from Weather Central Inc. of Madison, Wis. The ADONIS Microcast model is a sophisticated computer implemented weather forecasting model that employs information on current weather conditions as initial conditions. Such a weather forecasting model is able to generate detailed predictions of various weather conditions (e.g., temperature, precipitation, wind speed, severe weather conditions, etc.) having a high degree of geographic and temporal resolution and with significant accuracy. Such high resolution forecast weather condition information may then be used to provide forecast weather information for each geographic grid area that is then used by the TrafficCast traffic forecast model to generate accurate traffic forecasts for the various modeled traffic routes that pass through the grid areas.

Thus, although it is known to use weather information in traffic forecast modeling, to date weather information used for such a purpose has been generated and formatted specifically for particular traffic forecast model applications. Weather information has not generally been made available in a form that is useful generically for traffic forecasting or for use in other traffic related products and services, such as navigation, traffic flow and routing. Specifically, the common denominator in traffic flow and routing analysis is the road segment, not a geographic grid area. What is desired, therefore, is a system and method for generating and providing weather information that is specific for specific road segments and which, therefore, will be readily useful for enhanced traffic flow, routing, and navigation generation. Such a system and method preferably provides weather information in the form of one or more numerical or other index values for a plurality of road segments and for a plurality of time periods. Thus, users of such a system or method, or applications using the information provided thereby, can readily determine weather effects at particular road segments at specific points in time for a variety of applications, such as traffic routing.

BRIEF SUMMARY OF THE INVENTION

The common denominator in traffic flow and routing is the use of road segments. Each route to be considered may consist of thousands of such road segments. The condition of traffic flow on these road segments is the usual output of any traffic sensor or modeling system. Like road segment flow information, embodiments of the present invention provide weather indexes for each road segment for a plurality of time periods (past, present, and/or future) using a number of historic real-time and forecast variables. This mapped weather data may then be used by various traffic and mapping companies or applications to help calculate traffic flow, determine alternative routing, and make fleet management decisions.

Embodiments of the present invention provide a system and method for providing historical, real time and forecast weather information that is mapped to defined road segments for a series of time periods. Such mapped weather data will be useful specifically as an input to systems and methods for traffic analysis and forecasting including navigation, traffic flow, and routing. A system for mapping weather data to road segments in accordance with one embodiment of the present invention may be implemented for substantially automatic operation in a conventional computer system. Weather information from historic data (climatological averages, trends), real-time (weather radar, satellite, weather sensors, government weather alerts) and forecast (weather forecast model) weather information sources is provided to the computer system. Road segments, typically defined by specific geographic end point locations, are provided in a road segment database or otherwise provided to the computer system.

Using weather mapping software implemented in the computer system, a system and method in accordance with some embodiments of the present invention generates weather indexes for various historic, real-time, and forecast weather conditions for a plurality of time periods for each desired road segment by appropriate extraction of the desired weather information from the weather information provided to the system from the various weather information sources and processing of the extracted weather information using appropriate weights and thresholds. For example, with real-time weather radar data, storm cell tracking, and rain/snow/mix masking, a system and method in accordance with one embodiment of the present invention may be used to provide weather indexes for the road segments being affected by precipitation for a plurality of time periods. The use of a weather forecasting model, such as Microcast, provides the ability for a system and method in accordance with an embodiment of the present invention to forecast various weather indexes for road segments for a series of times in the future. A summary weather index representing the total impact of weather on a road segment at a particular point in time (past, present, or future) may also be generated.

The resulting weather data mapped to road segments for a series of times may then be stored in an appropriate database and/or provided to another application in the form of a multi-dimensional data structure or table of road segments, time periods, and one or more weather indexes for each road segment time period. Such mapped weather data may be used, either manually or by automated systems for, for example, automated navigation, traffic flow and routing, and the like. The mapped weather data may be updated frequently as needed by repeating the process as new weather information is received from the weather information sources.

According to one exemplary embodiment, a computer-implemented method for generating a weather index mapped to a road segment for a particular time frame includes receiving weather condition information for a plurality of time periods, parsing the weather condition information to determine weather conditions for a road segment defined by a starting point and an ending point for the plurality of time periods, and generating a plurality of weather indices for the road segment. Each weather index is associated with one of the plurality of time periods and is representative of a predicted traffic impact based on historical information of the received weather conditions for the road segment. The plurality of time periods includes at least one future time period and the weather condition information includes forecasted weather information.

Thus, embodiments of the present invention provide a highly useful data source of weather information for any type of route planning, fleet management systems and forecasted flow calculations. Mapping weather data to road segments in the form of indexes for specific times is a feature of the present invention that makes such weather data easy to use and valuable as a data product for such potential traffic related applications.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
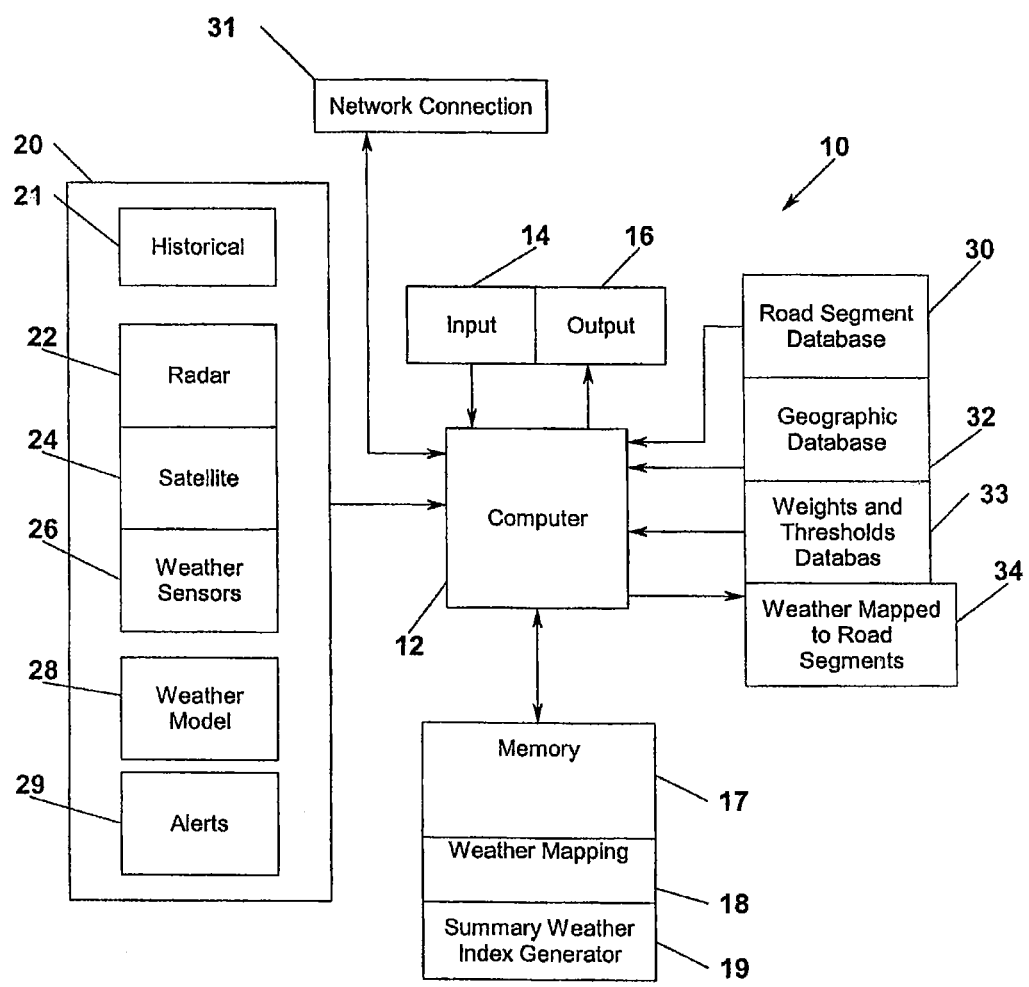
FIG. 1 is a schematic block diagram of an exemplary system for mapping weather data to road segments in accordance with the present invention.

An exemplary system 10 for mapping weather data to road segments in accordance with the present invention will be described in detail with reference to FIG. 1. A system 10 for mapping weather data to road segments in accordance with an embodiment of the present invention preferably is implemented in software running on a conventional computer system 12. The computer system 12 may be a single computer or multiple computers coupled together via a conventional network for operation together in a conventional manner. The computer system 12 preferably is provided with conventional input 14 (keyboard, mouse, etc.) and output 16 (monitor, printer) or display devices to allow an operator of the system 10 to interact therewith in a conventional manner.

The computer system 12 is preferably also provided with memory 17 which may be provided in the form of one or more conventional memory devices (e.g., ROM, RAM, disc storage, etc.). Such memory 17 preferably contains weather mapping software 18 which is run on the computer system 12 to perform the functions of mapping weather data to road segments in accordance with the present invention, as described in further detail herein. Memory 17 also may contain summary weather index generation software 19 which is run on the computer system 12 to generate a summary (or severity or impact) index for a series of time periods for the road segments based on the weather mapped to the road segments, as also described in further detail herein. Conventional software applications necessary or desirable for the general operation of the computer system 12 (such as operating system software, networking software, database software, etc.) may also be provided in memory 17. With reference to the detailed written description and functional flow chart diagrams provided herein a person of ordinary skill in the art of computer programming for weather related applications will be able to implement a method for mapping weather data to road segments in accordance with the present invention on a conventional computer system using conventional operating systems and programming languages.

In accordance with an embodiment of the present invention, weather information is provided to the system 10 from various weather information sources 20. Such weather information sources 20 preferably may include historic archived or climatological weather data 21, real-time or generally current weather information sources, such as weather radar 22, weather satellite 24, and weather sensor 26 sources, as well as forecast weather information sources, such as from weather models 28, and weather warnings and/or alerts 29 from government or other providers, such as the National Weather Service. Other or different weather information sources, such as real-time lightning strike data information sources, also, or alternatively, may be used to provide weather information to the system 10. The desired weather information sources 20 employed will depend upon the desired weather information indexes to be provided for the road segments, as will be discussed in more detail below. Each weather information source 20 may provide its particular weather information in a specific format and using specific protocols.

Historic weather data 21 may include weather data from the real-time or generally current weather information sources (e.g., radar 22, satellite 24, and/or weather sensor 26 information) that is received by the system 12 and appropriately time stamped and archived as historic weather data 21. Historic weather data 21 may also include historic archived weather data and/or climatological weather data from external sources of such data.

Weather radar data provided to the system 10 from weather radar sources 22 may include data from live local weather radars and/or weather data provided from government weather radar sources, such as the National Weather Service NEXRAD weather radar system. Weather radar from local weather radars is substantially real-time. NEXRAD weather radar data provides much more detailed and processed weather radar information products, but is delayed from real-time by about six minutes.

Weather sensor weather information data sources 26 include automated and manned weather stations and devices that provide a variety of general weather information (temperature, precipitation, wind speed and direction, etc.) at specific geographic locations and points in time. Such information may be provided automatically and continuously to the system 10 from the weather sensors 26 via an appropriate remote connection and/or manually input to the system 10, e.g., by remote weather observers via an internet or other connection to the system 10.

Forecast weather information is preferably provided by one or more weather models 28 providing a variety of forecast weather condition data (e.g., temperature, precipitation, wind, etc.) at a high degree of both geographic and temporal resolution. The ADONIS Microcast model described above is an example of such a weather forecast model. The weather forecast model 28 may be run, in whole or in part, on the computer system 12 that is used to implement weather data mapping to road segments in accordance with an embodiment of the present invention. Alternatively, output from a weather forecast model 28 run on a different computer may be provided to the system computer 12.

Figure 2:
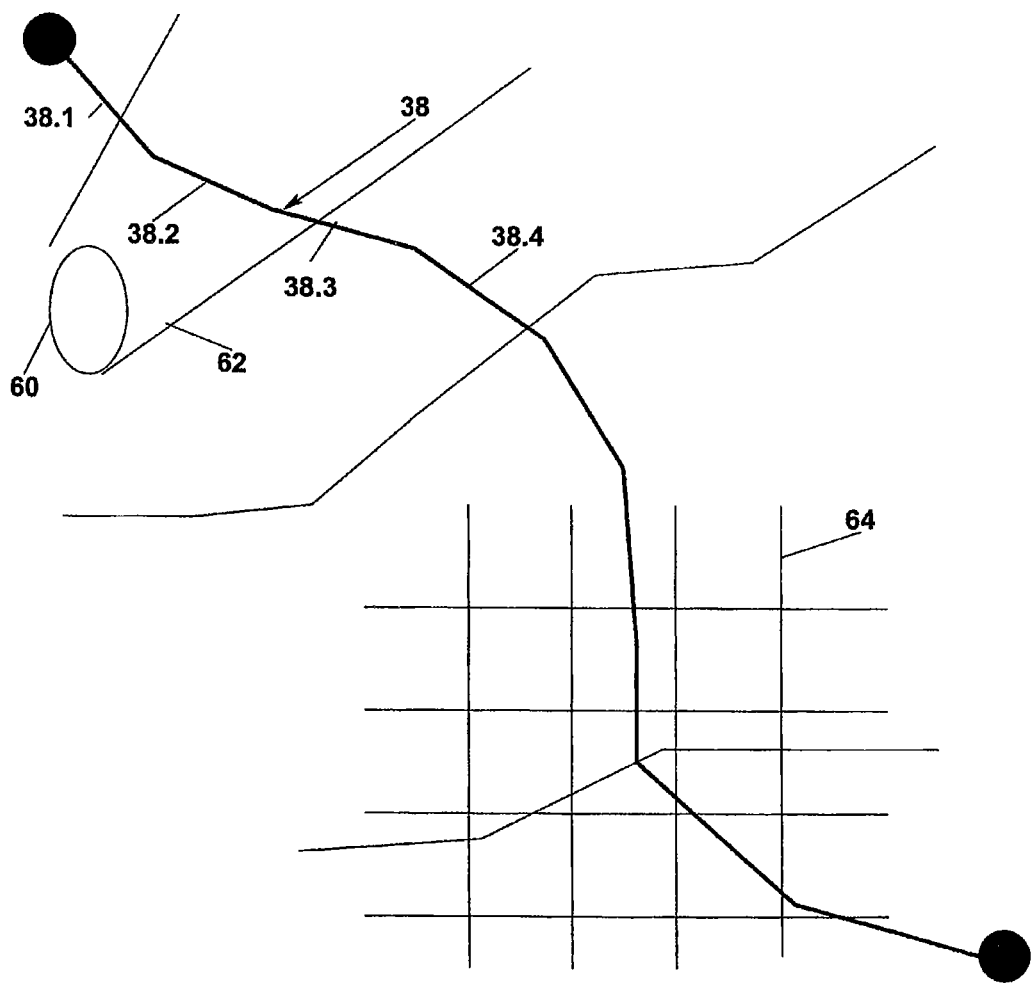
FIG. 2 is a schematic representation of a traffic route and the plurality of road segments forming such a route and the determination of weather affecting the various road segments using exemplary weather information sources.

As illustrated in FIG. 2, routes 38 used in traffic flow and routing, navigation, and other traffic related applications, are typically defined in terms of the road segments 38.1, 38.2, 38.3, etc. that together comprise the route 38. (Although only a few road segments are shown to comprise the exemplary route 38 in FIG. 2, it should be understood that a typical route used in many traffic related applications may consist of thousands of road segments.) Typically individual road segments that define a route 38 may be of unequal length and are generally defined in geographic space by the lat/lon of each of the end points (the start and end points) of the road segment.

Returning to FIG. 1, the large plurality of road segments that define a plurality of routes may be stored in a road segment database 30 that is accessible by the computer system 12. For example, the road segment database 30 may include a plurality (perhaps thousands of lat/lon pairs that define road segments for a plurality of routes and/geographic areas. The road segment database 30 may be part of a system 10 for weather data mapping in accordance with an embodiment of the present invention. Alternatively, the road segment database 30 may be held and maintained outside of the system 10, e.g., by a provider or application that provides traffic flow and routing, or the like. In the latter case, the road segment definition data defining road segments for which weather data is to be mapped in accordance with an embodiment of the present invention may be provided to the system 10 by the outside source at the appropriate time via any appropriate network connection 31.

A geographic database 32 may preferably be employed to facilitate the process of extracting and processing weather information from the various weather information sources 20 for mapping to road segments in accordance with an embodiment of the present invention. The geographic database 32 may contain general geographic information necessary for converting weather information provided from the weather information sources 20 into a lat/lon format preferred for mapping such weather information to the road segments. For example, a weather alert from a government weather alert source 29 may indicate that there is severe weather in a particular county. Geographic information in the geographic database 32 may be used to determine the range of lat/lon locations that comprise the referenced county in order to determine which road segments (defined by lat/lon) are located in the affected county.

A weights and thresholds database 33 contains weights and thresholds that are used by the system 10, in a manner to be described in more detail below, to generate weather indexes for specific points in time for various road segments from the weather information that is mapped to road segments by the system. In general, the weights and thresholds in the database 33 are used to translate mapped weather data into numerical or other indexes that represent various weather conditions at the road segments at various points in time. The weights and thresholds 33 used may be selected based on the ultimate use of the indexes to be generated by the system 10 in accordance with an embodiment of the present invention. For example, if the indexes are to be used for traffic flow and routing, the weights and thresholds used may be selected, based on empirical research, to translate accurately specific weather conditions to a numerical or other value that represents the effect of such weather conditions on traffic flow.

Time stamped weather data that is mapped to road segments in accordance with an embodiment of the present invention may be stored in an appropriate database 34 for later use, or sent immediately or at an appropriate time, by any appropriate network connection 31, to an outside application or provider. Thus, use of the weather mapped to road segments in accordance with an embodiment of the present invention for traffic flow and routing, navigation, and the like may be made either inside or outside of the system 10.

Figure 3:
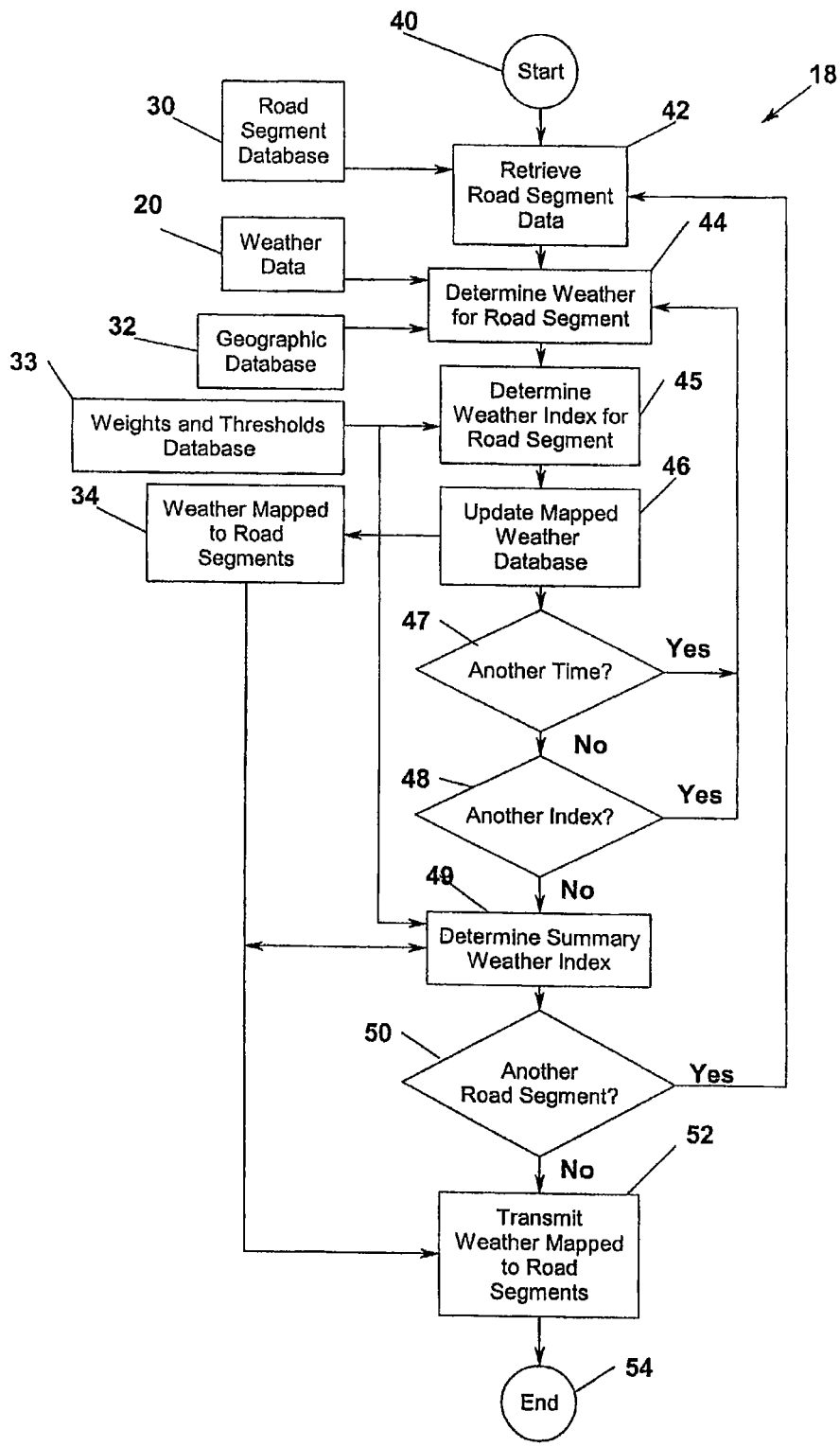
FIG. 3 is flow chart diagram of an exemplary method for mapping weather data to road segments in accordance with the present invention.

An exemplary method for mapping time stamped weather data to road segments in accordance with an embodiment of the present invention will now be described in detail with reference to FIG. 3. The mapping process 18 may be started 40 manually, periodically at desired user selectable intervals or times, or in response to an event trigger. Exemplary event triggers may include a request from an outside provider or application for an update of mapped data or the occurrence of specified changes in the weather information provided by one or more of the weather information sources 20 (e.g., the issuing of a new weather alert 29 or the detection by weather radar 22 of a new storm cell).

After starting 40 the process road segment data for a first road segment is retrieved 42 from the road segment database 30. As described above, the road segment data in the road segment database 30 may be provided and maintained either locally or remotely. The retrieved 42 road segment data may include, for example, the lat/lon end points that define the road segment.

A weather index is then determined for the road segment at 44 and 45. The weather index to be determined may be a historic weather index, a real-time or current weather index or a forecast weather index and is time stamped for a particular appropriate point in time (past, present or future) as the case may be. Exemplary real-time or current indexes for road segments that may be determined in accordance with an embodiment of the present invention may preferably include precipitation type (rain, mix, snow, etc.), precipitation intensity (dbz levels), precipitation accumulation (QPF), hail potential, tornado potential, storm cell arrival, storm cell attributes (hail, wind, TVS, MESO), etc. Forecast weather indexes for road segments that may be determined in accordance with an embodiment of the present invention may preferably include precipitation type, precipitation amounts, wind speed, precipitation accumulation, fog, temperature, etc.

The process used to determine a particular weather index for a road segment may be implemented in two basic steps. First, it is determined 44, based on weather information from the weather information sources 20 whether or not a particular type of weather affects the road segment at a specific time period and the specific characteristics of that weather at that road segment and time period. Such characteristics may depend upon the types of weather being considered, and may include such characteristics as an indication of weather intensity or size, severity, direction, probability of occurrence, etc. Second, based on the weather determined 44 to affect the road segment and the weights and thresholds from the weights and thresholds database 33 a numerical weather index is determined 45. Each of these basic steps 44 and 45 will now be described in more detail.

The process of determining 44 the weather affecting the road segment will depend upon the weather information source 20 and the form that the weather information is provided in from that source 20 for the particular weather index to be determined. The process used to determine 44 the weather affecting the road segment may make use of the geographic information from the geographic information database 32, as needed. Several examples of such processes follow, but others will be known to those skilled in the art.

To determine storm cell arrival at a particular road segment, storm cell 60 characteristics (e.g., wind speed, precipitation intensity, etc), location and speed and direction of movement information may be retrieved from a weather radar source 22. From this information a wedge shaped path 62 of predicted storm movement may be generated in a conventional and well known manner. (See FIG. 2.) The system 10 may then determine storm cell arrival by determining, for example, if either end point lat/lon of the road segment of interest is within the predicted storm path and 62, if so, determining the estimated storm arrival time at the lat/lon of the closest of the two road segment end points to the current storm cell location, using current detected storm speed and location. The result based on estimated storm arrival time and duration is an indication of the predicted storm conditions at the road segment for a series of time periods.

Most weather forecast models 28 provide weather forecast information for various types of weather for a series of future time intervals (e.g., one-half hour apart) for geographic grid locations 64. (See FIG. 2.) In such a case, determining 44 the forecast weather for a road segment requires determining in which modeled geographic grid areas the road segment is found. Since road segments of interest may cross modeled grid area borders, the system 10 preferably determines how best to extract and process model grid weather data to be mapped to a road segment. This may include using only model grid data for the geographic grid in which the largest portion of a road segment is found. Alternatively, the mapped forecast weather may be derived from modeled weather information for each modeled grid area through which a road segment passes, and may be weighted based on the portion of the entire road segment that is found in each relevant grid area.

Having determined 44 if a particular type of weather affects a road segment at a particular time, a numerical or other index for that weather type for the road segment for a particular time period is determined 45 using the determined 44 weather characteristics and weights and/or threshold from the weights and thresholds database 33. (As discussed above, the weights and thresholds 33 may be predetermined with particular reference to the effect of various types of weather on road travel.) For example, precipitation may be indexed on a scale of 1 to 10 (of course any quantitative or qualitative scale may be used) with a precipitation index of 1 corresponding to no precipitation and a precipitation index of 10 corresponding to very intense precipitation. The weights and thresholds 33 are used, in this case, to translate the determined 44 precipitation affecting the road segment into an index number between 1 and 10. Similar or different scales and procedures may be used to create indexes of this type for other types of weather determined to affect the road segment. The resulting weather indexes are very easily adaptable and useable by third party systems, (e.g., for traffic reporting, prediction, routing, etc.) involving the road segment.

After determining 45 a weather index for a particular road segment and time period, the determined index is mapped 46 to the road segment and the updated mapped data is stored in the mapped weather database 34.

The mapped weather index includes a time stamp indicating the time (past, present or future) for which the particular mapped index applies to the road segment. This process may then be repeated 47 for a series of time periods, as desired. (E.g., for calculating indexes based on modeled weather data 28 for a series of half hour periods into the future.) If another weather index 48 is to be determined or updated for a particular road segment the determining process 44 and 45 is executed again, perhaps using weather information from another weather information source 20 and a completely different weather index extraction and determination process.

A summary weather severity or impact index may be determined 49 for a road segment. The summary weather index may take the form of a single number or other indication that indicates the total weather impact (e.g., on traffic) at a particular time (or series of times) for a particular road segment. The summary weather index may be generated based on all of (or a subset of) the weather indexes or other weather information mapped to a road segment for a particular point in time (or including a series of time points) and appropriate weights and thresholds from the weights and thresholds database 33. For example, a road segment affected by light rain and very high winds may receive a summary weather index of 3 on a scale of 1 (little weather impact) to 10 (high weather impact). A road segment affected by heavy snow, no wind, but rising temperatures (chance of snow turning to rain) may receive a summary weather index of 8 on such a scale. Different scales, of course, may be used, and the actual index calculated will depend on the weights and thresholds 33 applied. The resulting summary index (for a particular time or series of times) is saved along with the other mapped weather indexes 34. Such a summary index may be used by certain third party systems and providers that need, or desire, a general indication of the weather effect at a particular road segment (e.g., for traffic prediction, routing, etc.).

The entire process being described may be repeated 50 for each road segment in the road segment database 30 for which weather indexes are to be calculated or updated.

The result of the process being described is a multi-dimensional table or other data structure comprising a series of road segments, a series of time periods associated with each road segment and one or more weather index values for each road segment/time period. As discussed above, a weather index determined in accordance with an embodiment of the present invention may be quantitative (e.g., a number) or qualitative (e.g., "high", "medium", "low", etc.) as required or desired by the end user of the data.

At the appropriate time, the mapped weather data 34 generated in this manner may be transmitted 52, e.g., via the network connection 31, to another process or location for use in determining traffic flow, routing, and the like. Such a transmission may be in real-time, or near real-time, as the mapped weather data for each road segment is updated, or in batch mode from the mapped weather data database 34. The process ends 54 with the weather data mapped to road segments in accordance with an embodiment of the present invention stored and/or transmitted for use.

Mapped weather indexes in accordance with an embodiment of the present invention may be made available for general use or tailored for user specific applications. For example, mapped weather data including a variety of different weather indexes may be made generally available for use as needed by specific users. Thus, a county highway department may access such mapped weather data to view predicted snow accumulation indexes for road segments in a county of interest. The department may thus quickly determine which road segments will become snow covered at what times and thus position snow clearing equipment for best effectiveness based on such information. By using weights and thresholds specifically tailored to a user application, mapped weather data in accordance with an embodiment of the present invention may be employed to enhance the effectiveness of applications such as sophisticated route planning software. For example, a traveler may enter start and end points for a route as well as a starting or arrival time into such a system. The system may then calculate the quickest route, taking into account not only static information (road segment distances) but also travel weather conditions at specific road segments at specific times as provided by a system and method in accordance with an embodiment of the present invention.

It should be understood that the present invention is not limited to the particular exemplary applications and embodiments illustrated and described herein. In particular, the individual functions of mapping weather data to road segments as described with reference to FIG. 3 may be implemented in a different manner and order from that described by example herein.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any nonclaimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for generating a weather index mapped to a road segment for a particular time frame, comprising:

(a) receiving weather condition information for a plurality of time periods, the weather condition information including historical data corresponding to the road segment and forecasted weather information corresponding to the road segment;

(b) parsing the weather condition information to determine, for each of the plurality of time periods, weather conditions for the road segment defined by a starting point and an ending point; and (c) generating, for each of the plurality of time periods, at least one weather index corresponding to the road segment, each weather index representing the predicted impact on traffic for the road segment for the respective time period, the predicted impact on traffic based at least in part on the historical data, wherein the plurality of time periods includes at least one future time period.

2. The method of claim 1, wherein each predicted impact on traffic is based on historical data particular to the road segment for which the weather index is being generated.

3. The method of claim 1, further comprising:
generating a travel route associated with a travel time, the travel route including a plurality of road segments and a weather index for the plurality of road segments, wherein each weather index is representative of the weather index that will be in effect for the corresponding road segment based on the travel route and arrival time.

4. The method of claim 3, wherein the arrival time for each particular road segment is determined based on the weather indices of the road segments previously scheduled along the travel route.

5. The method of claim 1, further comprising:
representing the weather conditions using indicia selected from the group of weather presentation formats consisting of weather condition color contours and weather condition icons.

6. The method of claim 5, further comprising:
representing the impact on traffic using indicia selected from the group of traffic presentation formats consisting of colors indicating travel speeds along the defined travel route and traffic affecting condition icons.

7. The method of claim 1, wherein the weather index generated for any particular road segment is calculated based on the highest predicted traffic impact anywhere along the road segment.

8. The method of claim 1, wherein the starting point and ending point of a road segment are provided as a longitude and latitude value.

9. The method of claim 1, wherein the weather condition information is filtered and the at least one weather index is calculated based on the filtered weather condition information to generate an application specific weather index.

10. The method of claim 9, further including
generating a snow plowing equipment allocation schedule based on the application specific weather index.

11. A computer-implemented system for generating a weather index mapped to a road segment for a particular time frame, comprising:

(a) a weather condition information source configured to generate weather condition information for a plurality of time periods, the weather condition information including historical data corresponding to the road segment and forecasted weather information corresponding to the road segment;

(b) a road segment database including a plurality of road segments, each segment defined by a starting point and an ending point;

(c) a weather mapping application configured to parse the weather condition information to determine, for each of the plurality of time periods, weather conditions for the road segments in the road segment database; and (d) a weather index generator configured to generate, for each of the plurality of time periods, at least one weather index corresponding to each road segment, each weather index representing the predicted impact on traffic for the road segment for the respective time period, the predicted impact on traffic based at least in part on the historical data, wherein the plurality of time periods includes at least one future time period.

12. The system of claim 11, wherein each predicted impact on traffic is based on historical data particular to the road segment for which the weather index is being generated.

13. The system of claim 11, further comprising a travel route generator configured to generate a travel route associated with a travel time, the travel route including a plurality of road segments and a weather index for the plurality of road segments, wherein each weather index is representative of the weather index that will be in effect for the corresponding road segment based on the travel route and arrival time.

14. The system of claim 13, wherein the arrival time for each particular road segment is determined based on the weather indices of the road segments previously scheduled along the travel route.

15. The system of claim 11, wherein the weather index generated for any particular road segment is calculated based on the highest predicted traffic impact anywhere along the road segment.

16. The system of claim 11, wherein the weather conditions are represented using indicia selected from the group of weather presentation formats consisting of weather condition color contours and weather condition icons.

17. The system of claim 16, wherein the impact on traffic are represented using indicia selected from the group of traffic presentation formats consisting of colors indicating travel speeds along the defined travel route and traffic affecting condition icons.

18. The system of claim 11, wherein the starting point and ending point of a road segment are provided as a longitude and latitude value.

19. The system of claim 11, wherein the weather condition information is filtered and the at least one weather index is calculated based on the filtered weather condition information to generate an application specific weather index.

20. The system of claim 19, further including generating a snow plowing equipment allocation schedule based on the application specific weather index.

21. A computer-implemented method for generating a weather index mapped to a road segment for a particular time frame, comprising:

(a) receiving weather condition information for a plurality of time periods, the weather condition information including historical data corresponding to the road segment and forecasted weather information corresponding to the road segment;

(b) parsing the weather condition information to determine, for each of the plurality of time periods, weather conditions for the road segment defined by a starting point and an ending point;

(c) generating, for each of the plurality of time periods, at least one weather index corresponding to the road segment, each weather index representing the predicted impact on traffic for the road segment or the respective time period, the predicted impact on traffic based at least in part on the historical data;

(d) generating a preliminary travel route including a plurality of road segments, each of the road segments having an arrival time;
(e) providing one of the weather indices for each road segment based on the preliminary travel route and arrival time for each road segment, wherein the predicted arrival time for each particular road segment is determined based on the weather indices of the road segments previously scheduled along the travel route; and
(f) modifying the preliminary travel route based on the provided weather indices to generate at least one additional travel route.

\* \* \* \* \*